Patented Sept. 8, 1953

2,651,339

UNITED STATES PATENT OFFICE 2,651,339

METHOD OF MANUFACTURING SHOE LASTS

Sture Sjöström, Simrishamn, Sweden, assignor to A B Svenska Skolästfabriken, Jarrestad, Sweden, a corporation of Sweden No Drawing. Application July 28, 1950, Serial No. 176,540. In Sweden October 19, 1949

3 Claims. (Cl. 144—309)

In the manufacture of wooden shoe lasts the work is usually profile milled after a model in two steps, viz. a coarse-milling operation and a fine-milling operation. In the fine-milling operation the last is given its proper outer contours. After a series of intermediate operations the fine-milled last is ground for removal of the milling traces which give the last an uneven rough surface. After grinding, the surface of the last is usually treated with cellulose lacquer dissolved in a thinning liquid. To obtain an even glossy surface and a certain resistance to moisture the last is finally polished with wax on polishing discs.

The disadvantages of this mode of operation are however numerous. To begin with there are difficulties in retaining the dimensions of the fine-milled last on its way through the factory, because variations of the relative moisture content of the ambient air will result in a changed wood moisture of the unprotected last, whereby it will also change its form (warp, swell, shrink, crack). Furthermore it is now known that the surface of the finished, wax-polished last is not completely resistant to moisture, but that moisture can still cause changes of dimensions. Finally the polished surface of the last is deteriorated by heavier attack of moisture due to the wood fibers of the last surface being caused to project from said surface despite the wax polish, and in addition the last surface is destroyed by the acetone used in the shoe manufacture.

It has been tried inter alia by impregnation with synthetic resin to give the last stability as to dimensions and resistance to moisture. The impregnation has been carried out after the grinding operation. When so impregnating the last with a water-soluble, not yet hardened synthetic resin, the fibers of the wood rise from the surface like in the above-mentioned impregnation with cellulose lacquer. After the setting of the synthetic resin the last is resistant to moisture, but the surface of the last is uneven due to the fibers having risen therefrom. The projecting fibers of the wood having been stiffened by the hardened resin, no glossy surface can be obtained in the wax polishing operation, but the last has to be reground or smoothed off.

After this smoothening the last may be wax-polished it is true, but a better finish is obtained by spraying it with synthetic resin lacquer.

The principal objects of the invention are to avoid the above-mentioned disadvantages with previous known last making methods and to obtain a substantial simplification of the known last making methods by providing a new and improved method in manufacturing shoe lasts. Other objects of the invention will be clear from the following description and the appendant claims.

To avoid the above-mentioned disadvantage of the last being unprotected against moisture during the course of manufacture the last is to be impregnated according to the invention with synthetic resin, preferably carbamide resin, immediately after the milling operation, especially the fine-milling operation, and before any other operation on the last. After the impregnation the resin is hardened or set in any convenient manner. By the resin impregnation immediately after the milling operation one obtains not only stability as to dimensions of the last from the moment when it has been given its desired dimensions, i. e. at the end of the fine-milling operation, but also—which is quite surprising—a simplification and cheapening of the process of manufacture. For it has proved that the surface layer of the last which is impregnated with synthetic resin is of such a thickness as not to be ground off when the milling traces are removed by grinding, for which reason it is not necessary to repeat the impregnation with synthetic resin after the grinding operation. As a consequence, it is also possible to dispense with the smoothening off otherwise necessary in the synthetic-resin impregnation, and instead treat the last surface with a synthetic-resin lacquer for obtaining the desired finish. A further and very essential advantage of the invention is that the grinding operation necessary to remove the milling traces is facilitated considerably so that less professional skill of the worker is required for this operation. That the grinding operation is facilitated, may be explained as follows. The contour of the last impregnated with synthetic resin after the fine-milling operation can be said to consist of a hard under surface from which stiffened fibers project. These stiffened fibers are readily ground off by the grinding belt, whereas the hard under surface is a natural limit contour for the grinding operation. The grinding is thus facilitated considerably on the points where the last surface is abruptly curved and where the worker—when the last has not been impregnated with synthetic resin in accordance with the present invention—has to develop great professional skill in order that the form of the last may not be destroyed, especially at projecting portions thereof.

What I claim and desire to secure by Letters Patent is:

1. A method of manufacturing shoe lasts comprising profile milling a wood piece in accordance with a model to a finished shape, partially impregnating said milled wood piece with synthetic resin and setting the synthetic resin immediately following the milling operation and prior to any additional operation on the wood piece to obtain a hard surface layer and stiffened riased fibers projecting therefrom and grinding away the projecting fibers and milling traces without deforming the shape of the milled last.

2. A method of manufacturing shoe lasts as claimed in claim 1 and wherein said synthetic resin partially impregnating said wood piece is a carbamide synthetic resin to enhance dimension stability and resistance to moisture.

3. A method of manufacturing shoe lasts by profile milling a wood piece in accordance with a model comprising milling the wood piece to a finished shape, impregnating the surface layer of the so-milled piece with synthetic resin and setting the synthetic resin after the milling operation and prior to any additional operation on the wood piece, and grinding the impregnated piece to remove milling traces and fibers raised by the impregnating, the surface layer being impregnated to such a thickness as not to be ground off during the grinding operation.

STURE SJÖSTRÖM.

References Cited in the file of this patent

UNITED STATES PATENTS

| Number | Name | Date |
| --- | --- | --- |
| 2,370,033 | Hall | Feb. 20, 1945 |